Aug. 24, 1965  M. E. SIMMONS ETAL  3,202,414
VEHICLE DOOR ACTUATOR
Filed Jan. 15, 1962  3 Sheets-Sheet 2
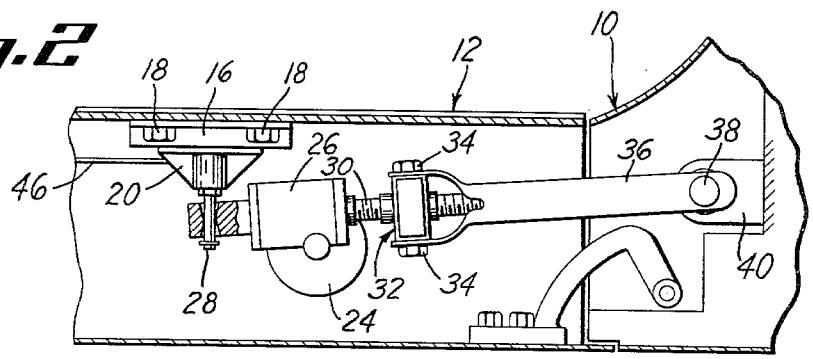
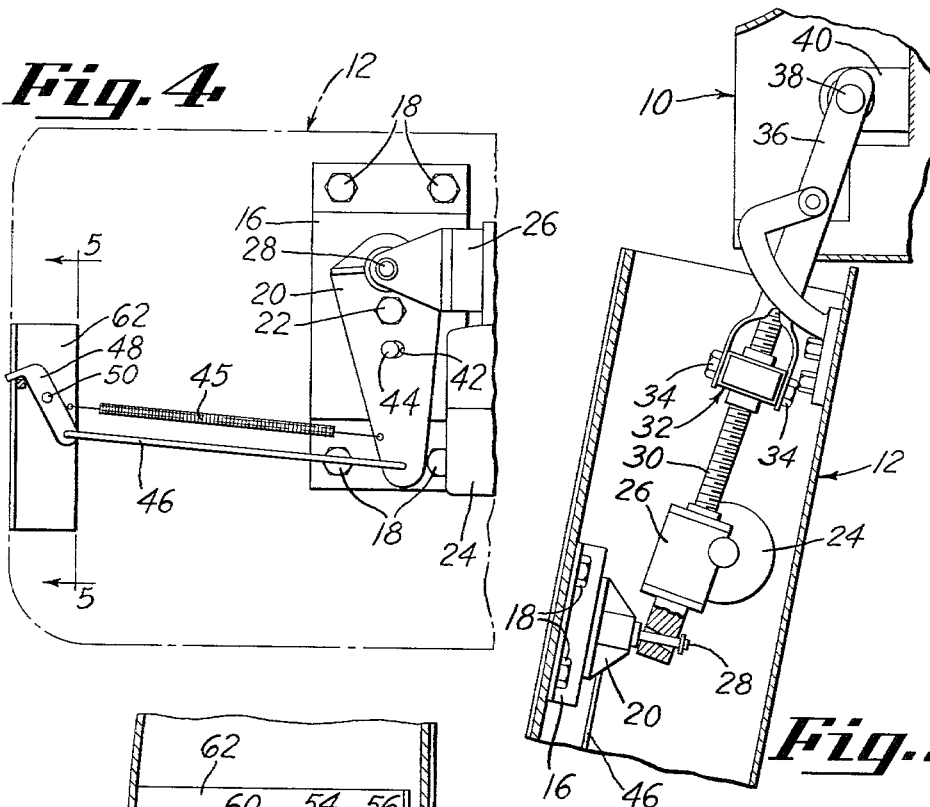
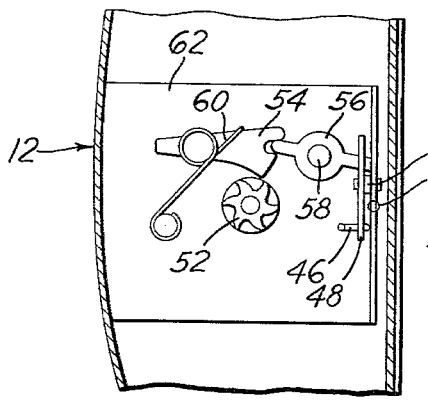
INVENTORS
MILTON E. SIMMONS
JOHN A. SCHUM
BY
THEIR ATTORNEY Aug. 24, 1965
M. E. SIMMONS ETAL
3,202,414
VEHICLE DOOR ACTUATOR
Filed Jan. 15, 1962
3 Sheets-Sheet 3
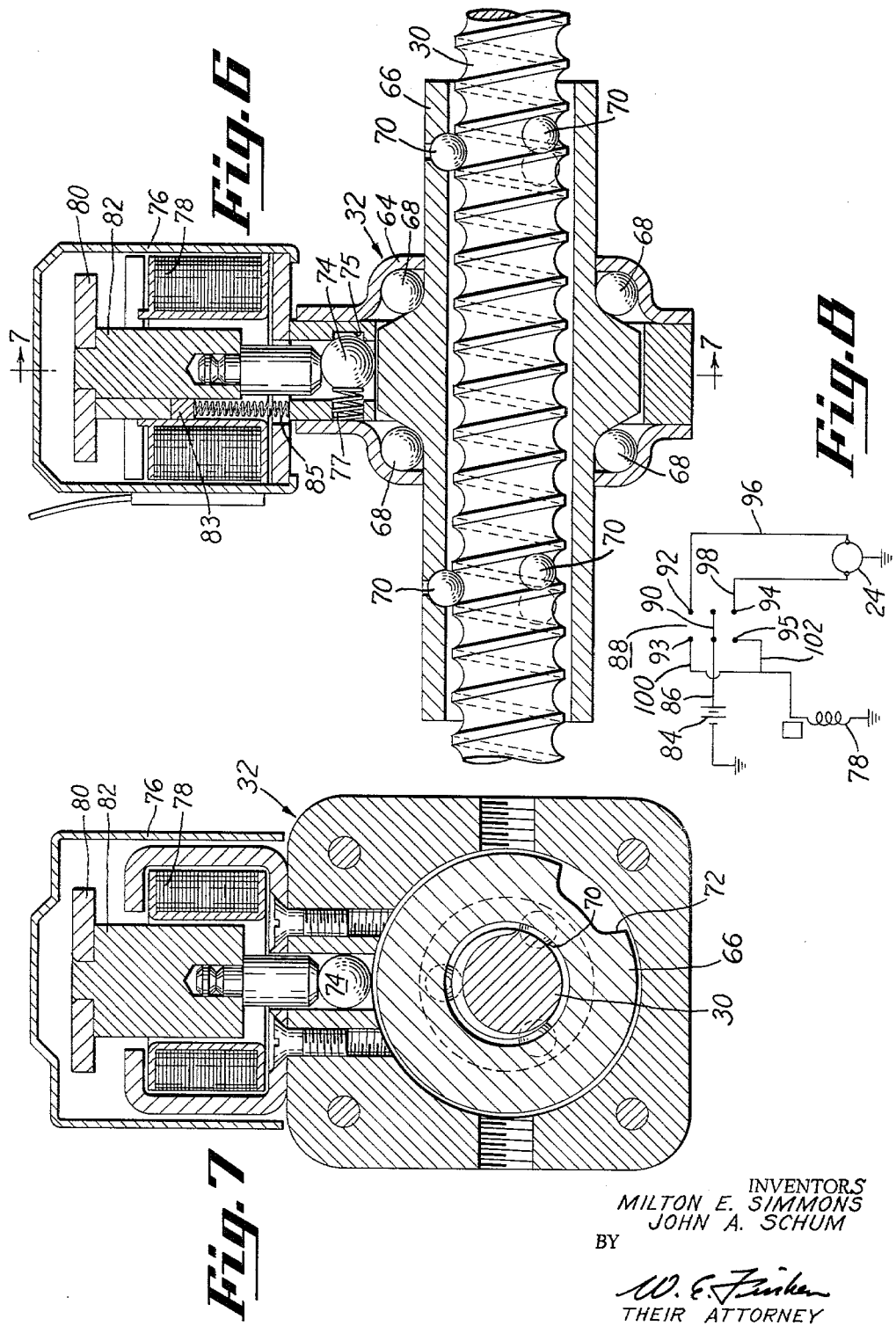
INVENTORS
MILTON E. SIMMONS
JOHN A. SCHUM
BY
*W. E. Finken*
THEIR ATTORNEY

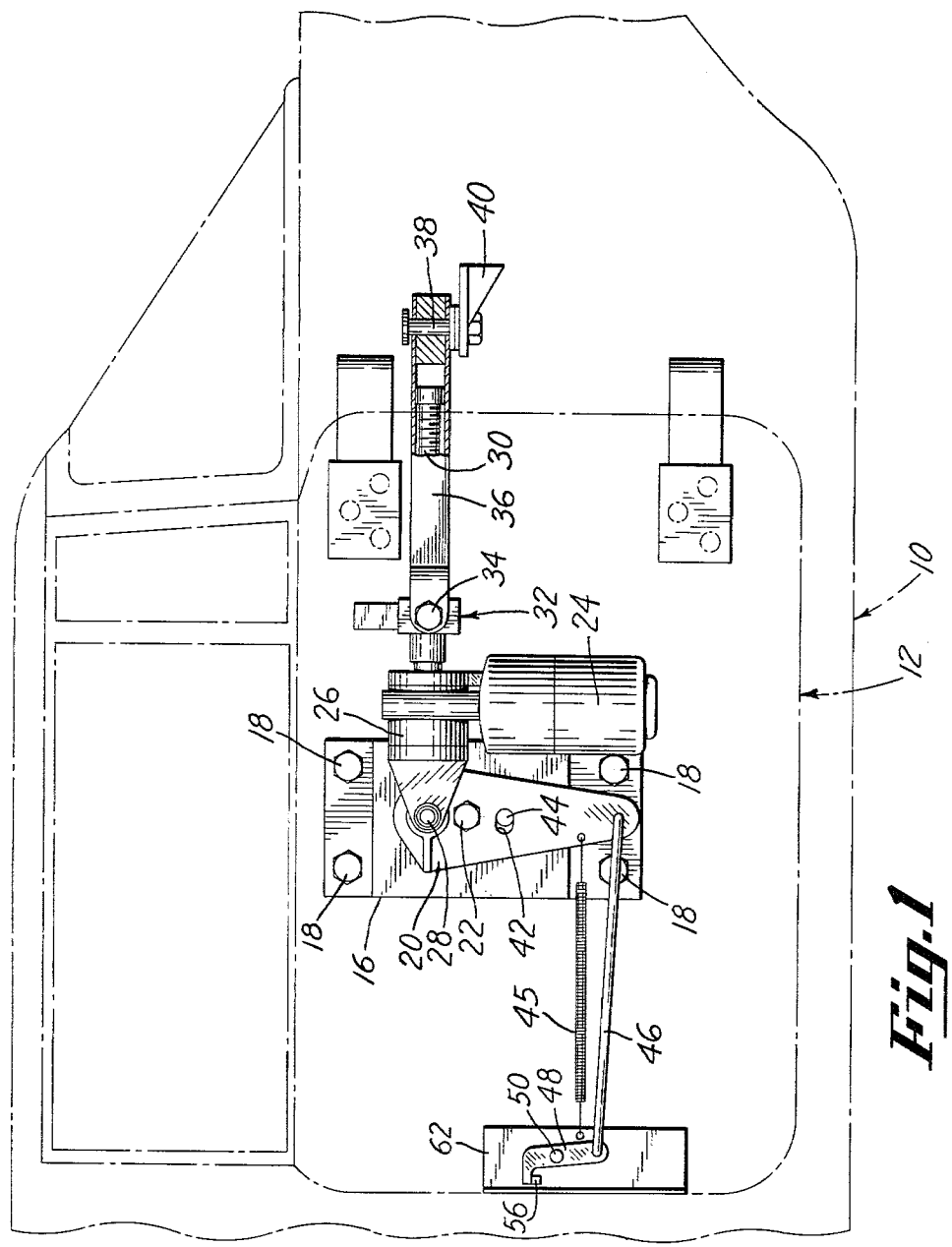

United States Patent Office 3,202,414
Patented Aug. 24, 1965

3,202,414
VEHICLE DOOR ACTUATOR
Milton E. Simmons and John A. Schum, Rochester, N.Y., assignors to General Motors Corporation, Detroit, Mich., a corporation of Delaware
Filed Jan. 15, 1962, Ser. No. 166,209
5 Claims. (Cl. 268—3)

This invention pertains to actuators, and particularly to an electric motor operated actuator for opening and closing a vehicle door.

Heretofore, electric motor operated actuators have been designed for closing vehicle doors, the actuator being designed to permit manual opening or manual closing, if desired, of the door. The present invention relates to an improved actuator which is constructed and arranged to both open and close a vehicle door automatically, including provisions for manually opening or closing of the door independently of the actuator. Accordingly, among our objects are the provision of an electric motor operated actuator for opening and closing a vehicle door; the further provision of an actuator of the aforesaid type including a jackscrew; and the still further provision of a vehicle door actuator including provisions for manually opening and closing the vehicle door independently of the actuator.

The aforeemntioned and other objects are accomplished in the present invention by embodying a solenoid clutchable nut in the jackscrew in combination with an energizing circuit for the reversible electric motor and the nut actuating solenoid. Specifically, the actuator comprises a reversible electric motor which is drivingly connected through a suitable gear reduction to a jackscrew which is engaged by a solenoid clutchable nut. The solenoid clutchable nut is rotably journalled in a housing, the housing being attached to a tube which is pivotally supported in the vehicle body. Thet reversible motor is mounted in the vehicle door, and accordingly, the motor and jackscrew partake of the swinging movement of the door during opening and closing thereof, which movement is permitted by the pivotal support of the jackscrew tube.

The motor and gear reduction unit are attached to a pivotally mounted lever such that the jackscrew reaction upon energization of the motor results in slight pivotal movement of the lever sufficient to actuate the unlatching mechanism for the door. During manual opening and closing of the door, the nut actuating solenoid is deenergized thereby permitting the nut to rotate freely relative to the jackscrew so as not to interfere with manual door operation. However, upon energization of the motor, the nut actuating solenoid is energized thereby arresting rotation of the nut, and consequently upon rotation of the jackscrew the nut will reciprocate relative thereto and thus open or close the door depending upon the direction of motor rotation.

Further objects and advantages of the present invention will be apparent from the following description, reference being had to the accompanying drawings, wherein a preferred embodiment of the present invention is clearly shown and wherein similar numerals depict similar parts throughout the several views.

In the drawings:
FIGURE 1 is a fragmentary phantom view of a portion of a vehicle depicting the door actuating means of the present invention.

FIGURE 2 is a fragmentary horizontal section through the vehicle body and door in the closed position.

FIGURE 3 is a view similar to FIGURE 2 in the open position.

FIGURE 4 is a fragmentary view, in elevation, depicting the manner in which the door is unlatched upon energization of the motor.

FIGURE 5 is an enlarged fragmentary sectional view taken along line 5—5 of FIGURE 4.

FIGURE 6 is a fragmentary view, partly in section and partly in elevation, of the solenoid clutchable nut.

FIGURE 7 is a sectional view taken along line 7—7 of FIGURE 6.

FIGURE 8 is a an electrical schematic of the control circuit for the door actuator.

Referring to FIGURE 1, a portion of a vehicle is shown including a body 10 having a door 12 hingedly connected thereto for swinging movement relative to the body so as to permit the ingress and egress of persons to and from the vehicle. A bracket 16 is attached to the inner door panel by bolts 18, and a lever 20 is loosely pivotally supported by a pin 22 on the bracket 16. A reversible electric motor 24 having an integral reduction unit 26 is pivotally connected at 28 to the lever 20. A jackscrew 30 extends outwardly from the gear reduction unit 26, the axis of the jackscrew being substantially normal to the axis of the motor armature, as seen in FIGURE 1.

The jackscrew 30 is engaged by a a solenoid clutchable nut 32 attached by bolts 34 to a tube 36 which encloses a substantial portion of the jackscrew when the door is closed. The tube 36 is pivotally supported in the body 10 by a substantially vertical hinge pin 38 carried by a bracket 40. As seen particularly in FIGURES 1 and 4, the lever 20 is formed with an elongate hole 42 spaced beneath the pin 22 through which a stop bolt 44 extends, the stop bolt 44 having threaded engagement with the bracket 16. The stop bolt 44 limits pivotal movement of the lever 20 about the axis of the pin 22 in both directions in the plane of the door 12.

As in well recognized in the dynamoelectric machine art, upon energization of an electric motor and actuator of a worm and gear, a phenomenon known as jackscrew reaction occurs which usually exemplifies itself in axial thrust of the jackscrew shaft. This jackscrew reaction, in the present embodiment, will result in pivotal movement of the lever 20 due to the fact that the motor 24 and its integral gear reduction units 26 is supported on the lever 20 by the pivotal connection 28. In the present invention, the jackscrew reaction upon energization of the motor 24 is utilized to perform an unlatching function of the door. Thus, as seen in FIGURES 1 and 4, the lever 20 is connected by a link 46 to a lever 48 having an intermediate pivot 50. The lever 48, as seen in FIGURE 5, is operatively connected with a keeper 54 through an intermediate lever 56 having a pivot at 58, the keeper coacting with a rotary bolt 52 of conventional design. The keeper 54 is normally maintained in engagement with the bolt 52 by a torsion spring 60, the several parts of the door latching machanism being supported by a bracket 62.

The vehicle door is shown in the closed position in FIGURE 2, and in the open position in FIGURE 3. As seen particularly in FIGURES 2 and 3, the bracket 16 upon which the lever 20 is pivotally mounted is an ordinary bolt with a bearing surface.

As seen in FIGURE 4, upon energization of the motor 24 the lever 20 pivots in a counterclockwise direction about the pivot pin 22 thereby actuating the unlatching linkage to remove the keeper 54 from the rotary bolt 52. Of course, when the motor is deenergized, the lever 20 pivots in the clockwise direction enabling the keeper 54 to reengage the bolt 52. It will be understood that the lever 20 pivots in the reverse direction upon motor deenergization due to a return tension spring 45.

Referring to FIGURES 6 and 7, the solenoid clutchable nut assembly includes a housing 64 within which a nut 66 is rotatably journalled by ball bearing assembly 68. Preferably, although not necessarily, the nut 66 constitutes a component of a ball screw and nut assembly wherein the threaded connection between the jackscrew 30 and the nut 66 is effected by a plurality of caged balls 70 so as to reduce friction to a minimum. This is particularly important in an installation where the door is capable of being opened and closed manually independently of the actuator. As seen in FIGURE 7, the nut 66 is formed with a peripheral notch 72 designed to receive a ball 74 for restraining rotation of the nut 66 relative to the housing 64. To achieve this result, the clutchable nut assembly includes a solenoid 76 including a coil 78, an armature 80 and a plunger 82 for moving the ball 74 into engagement with the notch 72 of the nut. The plunger 82 includes a magnetic shunt 83, and is biased upwardly by a spring 85. The ball 74 is normally maintained in engagement with a seat 75 by a transversely acting coil spring 77. However, upon energization of the coil 78, the plunger 82 acts upon the surface of the ball 74 so as to move it into the notch 72 of the nut 66 when the nut 66 is rotated to a position where the notch 72 is in alignment therewith.

Referring to FIGURE 8, the control circuit for the door actuator includes the vehicle battery 84, one terminal of which is grounded and the other terminal of which is connected to a wire 86 to a double pole double throw switch 88 having a movable contact 90 and spaced stationary contacts 92, 93, 94 and 95. Contact 92 is connected by wire 96 with one terminal of the reversible electric motor 24, and the contact 94 is connected by wire 98 to the other terminal of the motor. Stationary switch contact 93 is connected by a wire 100 to coil 78 of the solenoid clutchable nut 32, and stationary contact 95 is likewise connected to coil 78 by wire 102.

Accordingly, when the movable contact 90 is engaged with either set of stationary contacts 92, 93 or 94, 95, the solenoid 76 of the clutchable nut will be energized so as to restrain rotation of the nut 66, and the motor 24 will be energized for rotation in one direction or the other dependent upon which set of contacts 92, 93 or 94, 95 is engaged by the movable contact 90.

When the movable contact 90 is disengaged from both sets of contacts 92, 93 and 94, 95, the vehicle door 12 can be operated manually in the normal manner. Under these conditions, the nut body 66 of the solenoid clutchable nut 32 is free to rotate relative to the jackscrew 30, jackscrew 30 being restrained against rotation since the motor 24 is deenergized. Accordingly, the actuator will not interfere with conventional manual opening and closing movement of the door. On the other hand, if the door is closed and the movable contact 90 is engaged with contacts 92, 93, the motor 24 will be energized in a direction so as to open the door, and simultaneously the coil 78 will be energized to engage the clutchable nut 32. Upon energization of the motor 24, the jackscrew reaction will shift the lever 20 so as to unlatch the door, and accordingly, rotation of the jackscrew 30 will result in movement of the clutchable nut 32 from the position of FIGURE 2 to the position of FIGURE 3, thus opening the vehicle door. The motor 24 can be operated on a "stall" cycle and thus the system does not require limit switches for deenergizing the motor. In other words, when the door is fully opened as determined by the usual door check, the plunger 82 is forced upwardly to de-clutch the nut 66. The shunt 83 prevents the plunger from returning to the extended position.

When the door is open, it can be closed either manually or by use of the actuator. If the switch contact 90 is engaged with the contacts 94, 95, the solenoid 78 of the clutchable nut will be energized as will be the motor 24, in the reverse direction, thereby causing the jackscrew to rotate so as to move the clutchable nut 32 from the position of FIGURE 3 to the position of FIGURE 2, so as to close the door 12. When the vehicle door 12 is closed, the nut 66 is de-clutched by latching the door in the fully closed position.

While the embodiment of the invention as herein disclosed constitutes a preferred form, it is to be understood that other forms might be adopted.

What is claimed is as follows:

1. In a vehicle having a door hingedly connected to the body of said vehicle, a latch for retaining the door in the closed position, a reversible electric motor, a jackscrew drivingly connected to said motor, a lever mounted on said door and pivotally supporting said electric motor, linkage means interconnecting said lever and said latch whereby the jackscrew reaction upon motor energization will actuate said linkage to unlatch said door, and nut means disposed within said door, threadedly engaging said jackscrew and pivotally supported in said vehicle body whereby rotation of said jackscrew will reciprocate said nut to open or close said vehicle door in accordance with the direction of rotation of said motor.

2. The combination set forth in claim 1 wherein said lever has an elongate hole spaced from said pivot, and a stop extending through said elongate hole for limiting pivotal movement of said lever in the plane of said door due to jackscrew reaction.

3. Power operated door mechanism comprising, a door movable between open and closed positions, a latch for retaining the door in the closed position, a rotatable jackscrew mounted within said door, reversible power means for rotating said jackscrew, means interconnecting said latch and said jackscrew for releasing said latch due to jackscrew reaction upon energization of said power means, and reciprocable nut means disposed within said door and threadedly engaging said jackscrew to open or close said door in accordance with the direction of rotation of said power means.

4. Power operated door mechanism comprising, a door movable between open and closed positions, a latch for retaining the door in the closed position, a lever pivotally attached to the door, a rotatable jackscrew operatively connected with said lever, reversible power means for rotating said jackscrew, linkage means interconnecting said lever and said latch for automatically releasing said latch due to jackscrew reaction upon energization of said power means, and reciprocable nut means disposed within said door and threadedly engaging said jackscrew to open or close said door in accordance with the direction of rotation of said power means.

5. Power operated door mechanism comprising, a door movable between open and closed positions, a latch for retaining the door in the closed position, a lever pivotally attached to the door, a rotatable jackscrew operatively connected with said lever, reversible power means for rotating said jackscrew, linkage means interconnecting said lever and said latch for automatically releasing said latch due to jackscrew reaction upon energization of said power means, return spring means attached to said lever for moving said lever to permit reengagement of said latch upon deenergization of said power means, and reciprocable nut means disposed within said door and threadedly engaging said jackscrew to open or close said door in accordance with the direction of rotation of said power means.

References Cited by the Examiner

UNITED STATES PATENTS

| | | | |
|---|---|---|---|
| 1,674,662 | 6/28 | Rowntree | 268—65 X |
| 1,868,599 | 7/32 | Griffin | 268—65 |
| 2,545,755 | 3/51 | Hall | 268—54 |
| 2,844,969 | 7/58 | Lohr | 74—424.8 |
| 3,069,151 | 12/62 | Cook | 268—71 X |

HARRISON R. MOSELEY, *Primary Examiner.*